April 30, 1940.  R. POLK, SR., ET AL  2,199,345
METHOD FOR REMOVING CITRUS JUICE CELLS FROM INEDIBLE PORTIONS
Filed April 13, 1938   2 Sheets-Sheet 1

INVENTOR.
Ralph Polk Sr. and
BY  Ralph Polk Jr.,
Hood + Hahn.
ATTORNEYS.

April 30, 1940.   R. POLK, SR., ET AL   2,199,345
METHOD FOR REMOVING CITRUS JUICE CELLS FROM INEDIBLE PORTIONS
Filed April 13, 1938   2 Sheets-Sheet 2
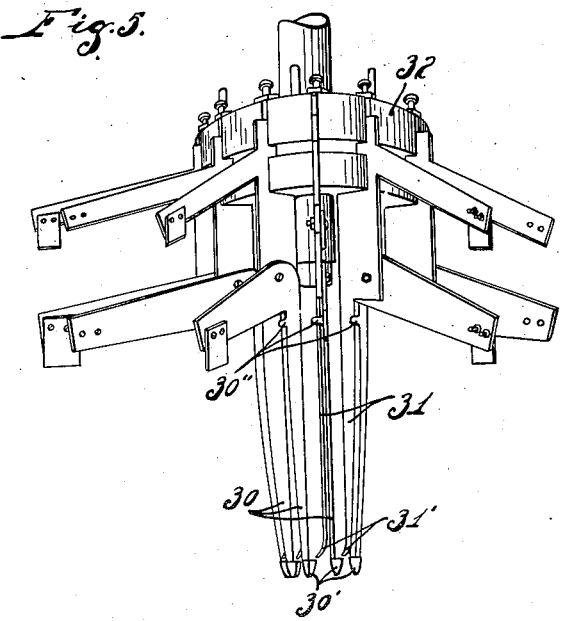
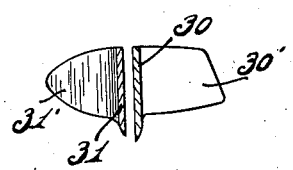
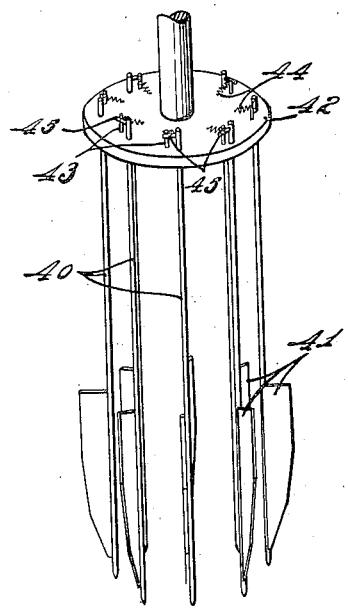
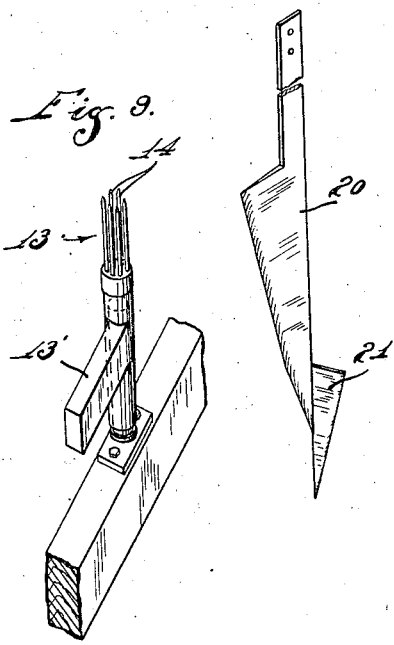
INVENTOR.
Ralph Polk Sr. and
Ralph Polk Jr.,
BY Hood & Hahn.
ATTORNEYS.

Patented Apr. 30, 1940

2,199,345

UNITED STATES PATENT OFFICE 2,199,345

METHOD FOR REMOVING CITRUS JUICE CELLS FROM INEDIBLE PORTIONS

Ralph Polk, Sr., Miami, and Ralph Polk, Jr., Haines City, Fla., assignors to The Polk Development Company, Tampa, Fla., a copartnership of Florida Application April 13, 1938, Serial No. 201,732

15 Claims. (Cl. 146—3)

The object of our invention is to provide improved means and methods by which substantially whole integument-free segmental juice-cell groups may be acquired from peeled citrus (and other similar) fruits.

Figure 1:
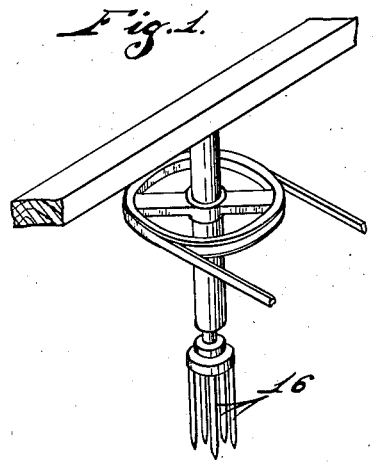
Figure 2:
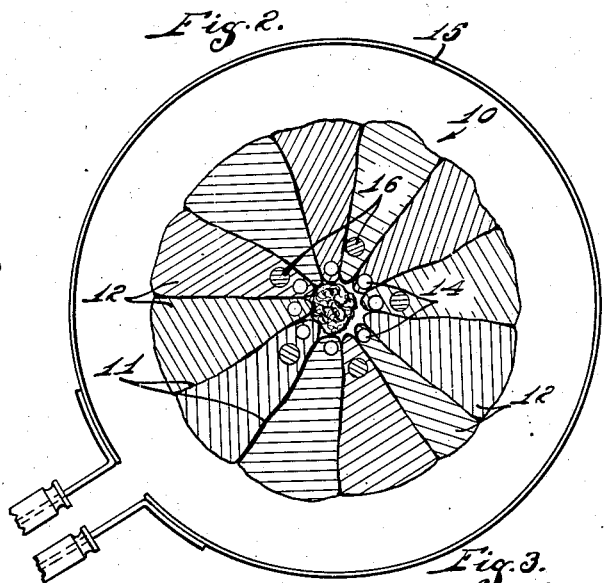
Figure 3:
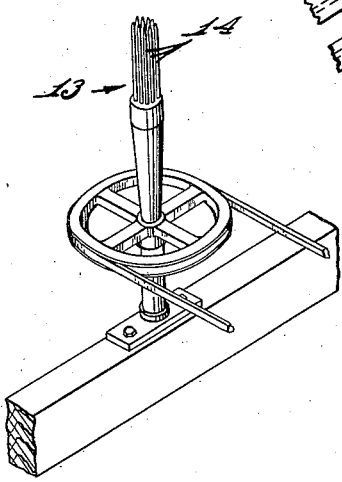
Figure 3:
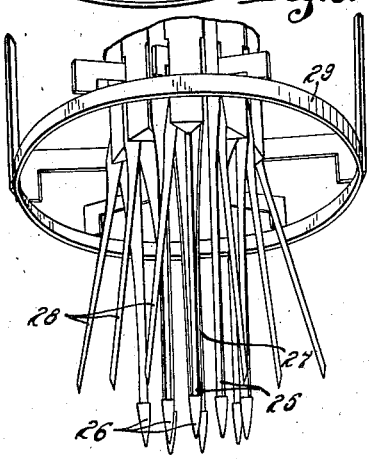
Figure 4:
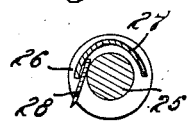

The accompanying drawings illustrate our invention:

Fig. 1 is a perspective view of a tined holder upon which a peeled fruit may be conveniently impaled for further manipulation, together with an associated tined element for segregating juice-cell groups from segment-integuments;

Fig. 2 a cross-section of a pealed fruit and the devices, shown in Fig. 1, in cooperative relationship;

Fig. 3 a perspective view of a group of one form of segmenting tool;

Fig. 4 a cross-section of one of the tools shown in Fig. 3;

Fig. 5 a perspective of a group of tools of another form;

Fig. 6 a cross-section of one of the tools shown in Fig. 5;

Fig. 7 a perspective view of an annular group of tools of another form;

Fig. 8 a perspective view of a tool of another form; and

Fig. 9 a perspective view of a modified form of throw-in fork.

In the drawings 10 indicates a peeled whole fruit, of the type having nature-formed and bonded segments, the circumferential integument encasing the juice-cell groups having been removed, leaving the radial integuments 11 undisturbed and nature-bonded to each other and to the segmental juice-cell groups 12.

The number of juice-cell groups (i. e., fruit sections) and consequently the included angle of any segment, is a variable in a tree-run of fruit, and the problem is to obtain, at reduced expense, a commercially practicable number of substantially whole integument-free juice-cell groups from each fruit.

We have found that if a whole peeled fruit be impaled on a fork, or holder 13 as shown in Fig. 1, comprising a circumferential series of laterally spaced, small-diameter, and slightly flexible tines 14, with the tines entering and extending polarwise in the apices of most of the segment integuments, and the impaled fruit be rotated at a fair speed about its polar axis, the juice-cell groups will be torn from their radial integuments and that, while many of the juice-cell groups will be broken into two or more pieces, nevertheless, many of the juice-cell groups will be discharged from the integuments substantially whole if a cylindrical apron 15 be provided to limit the radial ejection of the segments.

To this end, the holder 13 may, therefore, be mounted so as to be rotatable about the axis of the circumferential series of tines 14.

We have also found that if, after the peeled fruit is impaled on the tines 14, rubbing tines 16 be injected polarwise into some of the juice-cell groups between the radial integuments slightly spaced outwardly from the tines 14, and one or the other of the circumferential series of tines be rotated about the common axis, the juice-cell groups, substantially whole, will be separated from the radial integuments. A single rubbing tine 16 may be used to some effect but we have found that two to eight tines 16, equally spaced, are more efficient. In this operation the natural bond between the radial integuments and the juice-cell groups is ruptured by placing the radial integuments under tension transversely of their radial extent and the integuments are slipped or dragged free from the juice-cell groups.

We have also found that if the natural bond between one side of the juice-cell group and the adjacent radial integument be preliminarily ruptured (in a manner to be described) before subjecting the fruit either to centrifugal action or to the rubbing action of the series of tines 16, a considerably greater number of substantially-whole integument-free juice-cell groups may be obtained.

Various means have been provided for rupturing the natural bond between one side of the juice-cell groups and the radial integuments.

In Fig. 8 the thin blade 20 is tapered from point to heel and has a maximum width exceeding the radial dimension of the juice-cell group in the fruit to be segmented.

At the tip of the blade, flanking one side of the blade, is a thin blade 21 tapered from tip to heel and in a plane 90 degrees plus from the plane of the blade 20. The angle between these two blades is conveniently 90° plus ½ the included angle of an average fruit segment. The free edge of the blade 21 is not sharp enough to cut the radial integument of the fruit and the maximum width of blade 21 is such that the blade may be projected polarwise clear through a fruit segment between the two radial integuments of a segment without rupturing those radial integuments. The blade 20, above blade 21, is longer than the polar dimension of the fruit segments so that blade 21 having been projected clear through a fruit segment, blade 20, if narrow, may then be moved radially of the fruit to rupture the bond between one side of the juice-cell group and the adherent radial integument.

When the tip of blade 21 is injected into a segment of a whole peeled fruit no especial care need be exercised to accurately position the tip of the blade 21 laterally relative to the two radial integuments. As the tool is projected into the fruit, the free edge of blade 21 engaging one radial integument will push blade 20 toward the opposite integument so that, by the time the tip of blade 20 is ready to enter the fruit segment, blade 20 will be positioned adjacent and parallel with the opposite radial integument so that, as projection of the tool is continued, blade 20 will enter the fruit between the juice-cell group and the adjacent radial integument and rupture the natural bond therebetween. If the fruit be of the seedless variety, blade 21 may be quite narrow. If the fruit be of the seeded variety, the blade 21 should be somewhat wider at its heel because the tip of blade 21 should be inserted in the fruit radially beyond the seed region so that the seeds will be avoided as blade 21 proceeds through the fruit.

In Figs. 3 and 4, the tool comprises a main stem 25 having a tapered head 26 the butt of which has a diameter slightly greater than stem 25. Connected to head 26 parallel with stem 25 and spaced slightly therefrom, is a trough-shaped guard 27 upon the upper end of which is pivoted a thin, narrow, flexible blade 28 mounted to swing in a plane tangential to stem 25, the blade normally lying parallel with stem 25 in the space between said stem and guard 27 with the tip of the blade just above and guarded by the butt of head 26.

The diameter of head 26, stem 25 and guard 27 are such that the tool may be projected polarwise into a peeled fruit between the two radial portions of a segment integument without rupturing the integument. The tool is long enough to permit tip 26 to be projected entirely through the peeled fruit so that when the blade 28 is swung outwardly, it will rupture the natural bond between the juice-cell group and the adjacent radial integument. The stem and guard serve to automatically position the blade close to and substantially parallel with a radial integument and the blade being flexible, thin and narrow, we find that, as it is swung outwardly it takes the line of least resistance which is the plane of bond between the juice-cell group and the adjacent radial integument, thereby rupturing that bond rather than cutting through the juice cells.

A circumferential series of these tools, say from eight to eleven, may be arranged, as shown in Fig. 3, to simultaneously penetrate a peeled fruit, whereupon an actuating ring 29 may be caused to engage the swinging blades, preferably in two or more groups, to swing the blades outwardly as described. The lateral flexibility of the tools permits the blades to adjust themselves medially in the apices of fruit segments and, by selectively swinging the blades, the rupturing forces may be so distributed circumferentially of the fruit as to avoid rupture of the radial integuments.

In using a group of these tools, we find it desirable to preliminarily produce polar voids in the apices of the fruit segments without rupturing the radial integuments, in the manner described in our co-pending application Serial No. 181,074.

In Figs. 5 and 6 the tool comprises two closely associated thin, narrow, flexible blades 30 and 31, one pivoted to swing on the other, the two being arranged to straddle a pair of adherent radial integuments so that upon swinging, either together or in succession, they will rupture the bonds between adjacent juice-cell groups and the adherent radial integuments. Each blade 30 is provided, at its tip, with a laterally extending nub 30' which, upon projection into a fruit segment polarwise near its apex between its radial integuments, will serve to crowd blade 30 closely against one of the radial integuments. The other blade 31 is shorter than blade 30 and its tip 31' is bent laterally to facilitate entry of a pair of adherent radial integuments therebetween.

A circumferential group of these tools, as shown in Fig. 5, brings the nub 30' of one tool in position to underlie the tip 31' of the blade 31 of the next adjacent tool so that, upon projection into a fruit, the blade 31 is protected against lateral displacement, as it proceeds into the fruit, so that it will lie closely against the adjacent radial integument. Blade 31 may be pivoted in the carrying head 32 and the pivoted connection between the two blades may have sufficient frictional resistance to cause blade 31 to swing with blade 30 when it is swung, or the blades may be swung in succession, or blade 30 only may be swung depending upon whether it is desired to rupture the bonds between both sides of a juice-cell group and both radial integuments, or only one side and its integument. A finger 30" carried by blade 30 and overlying blade 31 serves as a gauge for proper initial coordination of the blades.

In Fig. 7, we show a circumferential series of tools, each comprising a depending rod 40 and a longitudinally-tapered thin blade 41 having a maximum radial extent exceeding the radial extent of the segments of fruit to be operated upon. The rods 40 are suspended from a head 42 so as to have some freedom of lateral displacement and are also capable of slight rocking about their vertical axes. Each blade is in a plane tangential to its rod and each blade is yieldingly biased toward a stop 43 on head 42 by a spring 44 attached at one end to the head and at the other to a finger 45 projecting radially from rod 40. When the lower tapered tip of a rod 40 enters a fruit segment, the tip of the rod serves to crowd the blade against the adjacent radial integument of the fruit and spring 44 permits the blade to adjust itself into parallelism, or substantial parallelism, with the radial integument, thus compensating for the natural variations in included angles of the fruit segments.

Tools of the character shown in Fig. 8 may likewise be arranged in a circumferential series so as to simultaneously act upon a plurality of segments of a peeled fruit, in the manner already described.

We have found that efficient results may be obtained (1) by impaling a peeled fruit on the tines 14 of a holder; (2) then forming voids polarwise in the apices of the segments without rupturing the radial integuments or the bond between adjacent integuments, as described in our above-mentioned copending application; (this step may be omitted though it contributes to efficiency), (3) then rupturing the bonds between a plurality of juice-cell groups and the radial integuments adherent to one side of each juice-cell group; (4) projecting a group of tines 16 into the fruit, as previously described, and then rotating one series of tines relative to the other thereby finally separating the whole juice-cell groups from the integuments which become wrapped around the inner series of tines 14.

Instead of using the rubbing tines 16 the tines 14 may be revolved around their group axis at sufficient speed to throw the juice-cell groups centrifugally from the integuments which remain.

In Fig. 9 the fork 13 is mounted, as above described, to rotate about its axis, conveniently vertical, and is provided with a radially projecting arm 13'. The fruit, preferably with one radial face of each or most of the juice-cell group separated from the adherent radial integument, is placed upon the tines 14 of the fork, as before described, and the projecting arm 13' is then struck a vigorous blow to cause rotation or partial rotation of the fork about its axis. In this arrangement the remaining adherent integuments are jerked away from the juice-cell groups against the inertia of the juice-cell groups.

In the use of the various tools, which have been illustrated, upon peeled citrus fruits, the fruits may be supported by various means in such manner that the tools may penetrate the fruits lengthwise of the nature-formed segments and swingable portions of the tools shown in Figs. 3 to 7 may be swung by hand or by suitable mechanism after fruit-penetration has been completed.

The details of such mechanism may vary widely and form no essential part of the present invention.

A convenient fruit support is a pronged structure like parts 13—14 in Fig. 1 or like the structure 52—53 shown in our Patent 2,121,098, conveniently used in conjunction with supports 43 shown in that patent, which supports are withdrawn prior to the swinging of the blades as described in said patent.

We claim as our invention:

1. The method of removing substantially-whole integument-free juice-cell groups from citrus fruits, which comprises the step of removing the peel, the step of impaling the fruit upon a holder of such character as to prevent rupture of the natural bond between the radial integuments of adjacent juice-cell groups, and the step of rotating the fruit about its polar axis at a speed sufficient to eject the juice-cell groups centrifugally from the integuments.

2. The method of removing substantially-whole integument-free juice-cell groups from citrus fruits, which comprises the step of removing the peel, the step of impaling the fruit upon a holder of such character as to prevent the rupture of the natural bond between the radial integuments of adjacent juice-cell groups, the step of rupturing the natural bond between one radial face and the adjacent radial integument of a plurality of juice-cell groups, and the step of rotating the fruit about its polar axis at a speed sufficient to eject the juice-cell groups centrifugally from the integuments.

3. The method of removing substantially-whole integument-free juice-cell groups from citrus fruits, which comprises the step of removing the peel and the major portion of the circumferential integuments, the step of impaling the fruit upon a holder of such character as to prevent the rupture of the natural bond between the radial integuments of adjacent juice-cell groups, and the step of rotating the fruit about its polar axis at a speed sufficient to eject the juice-cell groups centrifugally from the integuments.

4. The method of removing substantially-whole integument-free juice-cell groups from citrus fruit, which comprises the step of removing the peel and the major portion of the circumferential integuments, the step of impaling the fruit upon a holder of such character as to prevent the rupture of the natural bond between the radial integuments of adjacent juice-cell groups, the step of rupturing the natural bond between one radial face and the adjacent radial integument of a plurality of juice-cell groups, and the step of rotating the fruit about its polar axis at a speed sufficient to eject the juice-cell groups centrifugally from the integuments.

5. The method of removing substantially-whole integument-free juice-cell groups from citrus fruit, which comprises the step of removing the peel, the step of impaling the fruit on a holder of such character as to prevent the rupture of the natural bond between adjacent radial integuments, the step of projecting a rubbing element into the fruit polarwise of the segments and radially outside the aforesaid holding means but in the region of the apices of the juice-cell segments, and the step of causing relative rotation between the holder and the rubbing element about an axis substantially coincident with the polar axis of the fruit whereby the radial integuments are subjected to tension radially of the integuments sufficient to slip the integuments from the juice-cell groups.

6. The method of removing substantially-whole integument-free juice-cell groups from citrus fruit, which comprises the step of removing the peel and the major portion of the circumferential integuments, the step of impaling the fruit on a holder of such character as to prevent the rupture of the natural bond between the radial integuments, the step of rupturing the natural bond between one radial face and the adjacent radial integuments of a plurality of juice-cell groups, the step of projecting a rubbing element into the fruit polarwise of the segments and radially outside the aforesaid holding means but in the region of the apices of the juice-cell segments, and the step of causing relative rotation between the holder and the rubbing element about an axis substantially coincident with the polar axis of the fruit whereby the radial integuments are subjected to tension radially of the integuments sufficient to slip the integuments from the juice-cell groups.

7. That improvement in the art of segregation of integument-free segments from whole peeled fruits of the nature-formed-segment type, which comprises the step of skin removal, and the step of placing the radial integuments under tension, in the direction of their radial dimension, sufficient to cause slipping rupture of the natural bond between said integuments and the juice-cell group nature-bonded thereto while concurrently opposing movement of the bonded juice-cell group in the direction of said tension.

8. That improvement in the art of segregation of integument-free segments from whole peeled fruits of the nature-formed-segment type, which comprises the step of skin removal, the step of projecting a circumferential group of laterally spaced pins through the whole fruit polarwise therein and within the apices of the segment integuments, the step of projecting a second circumferential group of laterally spaced pins through the whole fruit polarwise therein and within the apices of the segment integuments, said second series of pins enveloping and being substantially coaxial with the first series, and the step of revolving one series of pins around the other, about an axis substantially coincident with the polar axis of the fruit, thereby placing the radial integuments under tension sufficient to slip-rupture the natural bond between said radial integuments and the juice-cell groups.

9. The method of removing substantially-whole integument-free juice-cell groups from citrus fruits, which comprises the step of removing the peel, the step of impaling the fruit upon a holder such as to hold the integuments against radial displacement, and the step of causing rotation of the fruit about its polar axis by a suddenly applied force sufficient to cause the integuments to be torn from the juice-cell groups against the inertia of said juice-cell groups.

10. The method of removing substantially-whole integument-free juice-cell groups from citrus fruits, which comprises the step of removing the peel and the major portion of the circumferential integuments, the step of impaling the fruit upon a holder such as to hold the integuments against radial displacement, and the step of causing rotation of the fruit about its polar axis by a suddenly applied force sufficient to cause the integuments to be torn from the juice-cell groups against the inertia of said juice-cell groups.

11. The method of removing substantially-whole integument-free juice-cell groups from citrus fruits, which comprises the step of removing the peel, the step of breaking the bonds between one face of a plurality of juice-cell groups from the adherent radial integument, the step of impaling the fruit upon a holder such as to hold the integuments against radial displacement, and the step of causing rotation of the fruit about its polar axis by a suddenly applied force sufficient to cause the integuments to be torn from the juice-cell groups against the inertia of said juice-cell groups.

12. The method of removing substantially-whole integument-free juice-cell groups from citrus fruits, which comprises the step of removing the peel and the major portion of the circumferential integuments, the step of breaking the bonds between one face of a plurality of juice-cell groups from the adherent radial integument, the step of impaling the fruit upon a holder such as to hold the integuments against radial displacement, and the step of causing rotation of the fruit about its polar axis by a suddenly applied force sufficient to cause the integuments to be torn from the juice-cell groups against the inertia of said juice-cell groups.

13. The method of removing substantially-whole integument-free juice-cell groups from citrus fruits, which comprises the step of removing the peel, the step of weakening the bond between one face of a plurality of juice-cell groups from the adherent radial integument, the step of impaling the fruit upon a holder such as to hold the integuments against radial displacement, and the step of causing rotation of the fruit about its polar axis at a speed sufficient to cause the integuments to be torn from the juice-cell groups.

14. The method of removing substantially-whole integument-free juice-cell groups from citrus fruits, which comprises the step of removing the peel and the major portion of the circumferential integuments, the step of weakening the bond between one face of a plurality of juice-cell groups from the adherent radial integument, the step of impaling the fruit upon a holder such as to hold the integuments against radial displacement, and the step of causing rotation of the fruit about its polar axis at a speed sufficient to cause the integuments to be torn from the juice-cell groups.

15. The method of removing substantially-whole integument-free juice-cell groups from citrus fruits, which comprises the step of removing the peel and the major portion of the circumferential integuments, the step of weakening the bond between one face of a plurality of juice-cell groups from the adherent radial integument, the step of impaling the fruit upon a holder such as to hold the integuments against radial displacement, and the step of causing rotation of the fruit about its polar axis by a suddenly applied force sufficient to cause the integuments to be torn from the juice-cell groups.

RALPH POLK, Sr.
RALPH POLK, Jr.